United States Patent
Bang et al.

(10) Patent No.: US 10,034,020 B2
(45) Date of Patent: Jul. 24, 2018

(54) VIDEO DATA DECODING METHOD AND VIDEO DATA DECODING APPARATUS

(71) Applicants: Electronics and Telecommunications Research Institute, Daejeon (KR); University-Industry Cooperation Group of Kyung Hee University, Yongin-si (KR)

(72) Inventors: Gun Bang, Daejeon (KR); Won Sik Cheong, Daejeon (KR); Nam Ho Hur, Daejeon (KR); Kyung Yong Kim, Suwon-si (KR); Gwang Hoon Park, Seongnam-si (KR); Young Su Heo, Suwon-si (KR)

(73) Assignees: ELECTRONICS AND TELECOMMUNICATIONS RESEARCH INSTITUTE, Daejeon (KR); UNIVERSITY-INDUSTRY COOPERATION GROUP OF KYUNG HEE UNIVERSITY, Yonging-si (KR)

( * ) Notice: Subject to any disclaimer, the term of this patent is extended or adjusted under 35 U.S.C. 154(b) by 280 days.

(21) Appl. No.: 14/434,321

(22) PCT Filed: Oct. 8, 2013

(86) PCT No.: PCT/KR2013/009000
§ 371 (c)(1),
(2) Date: Apr. 8, 2015

(87) PCT Pub. No.: WO2014/058216
PCT Pub. Date: Apr. 17, 2014

(65) Prior Publication Data
US 2015/0264398 A1    Sep. 17, 2015

(30) Foreign Application Priority Data

Oct. 9, 2012  (KR) .................. 10-2012-0112063
Oct. 15, 2012 (KR) .................. 10-2012-0114096

(Continued)

(51) Int. Cl.
*H04N 19/597*    (2014.01)
*H04N 19/513*    (2014.01)
(Continued)

(52) U.S. Cl.
CPC ....... *H04N 19/597* (2014.11); *H04N 13/0022* (2013.01); *H04N 13/0048* (2013.01);
(Continued)

(58) Field of Classification Search
CPC .......... H04N 13/0022; H04N 13/0048; H04N 19/513; H04N 19/52; H04N 19/547; H04N 19/597; H04N 19/70
See application file for complete search history.

(56) References Cited

U.S. PATENT DOCUMENTS

2011/0069760 A1* 3/2011 Lee .................. H04N 5/145
                                              375/240.16
2011/0222602 A1* 9/2011 Sung ................. H04N 21/235
                                              375/240.12
(Continued)

FOREIGN PATENT DOCUMENTS

EP    2 348 733 A2    7/2011
JP    2011-519227 A   6/2011
(Continued)

OTHER PUBLICATIONS

International Search Report dated Jan. 23, 2014 in counterpart International Application No. PCT/KR2013/009000 (5 pages, in English).

(Continued)

Primary Examiner — Peter D Le
(74) Attorney, Agent, or Firm — NSIP Law

(57) ABSTRACT

Disclosed is a method and apparatus for decoding video data. The method for decoding video data includes receiving coded video data including multi-view video data and depth data corresponding to the video data, acquiring motion data for inter-view prediction of a coding unit of the coded video data from the depth data, and performing inter-view prediction based on the motion data, and restoring video data according to the multi-view video data including the coding unit and the depth data based on the motion prediction.

14 Claims, 16 Drawing Sheets

(30) Foreign Application Priority Data

| Jan. 18, 2013 | (KR) | ......................... 10-2013-0006176 |
| Jan. 21, 2013 | (KR) | ......................... 10-2013-0006727 |

(51) Int. Cl.
| H04N 19/547 | (2014.01) |
| H04N 13/00 | (2018.01) |
| H04N 19/52 | (2014.01) |
| H04N 19/70 | (2014.01) |

(52) U.S. Cl.
CPC ........... *H04N 19/513* (2014.11); *H04N 19/52* (2014.11); *H04N 19/547* (2014.11); *H04N 19/70* (2014.11)

(56) References Cited

U.S. PATENT DOCUMENTS

| 2011/0255592 | A1* | 10/2011 | Sung .................. H04N 13/0011 375/240.02 |
| 2012/0263231 | A1* | 10/2012 | Zhou ...................... H04N 19/52 375/240.12 |
| 2013/0114689 | A1* | 5/2013 | Chang .................. H04N 19/597 375/240.03 |
| 2013/0176390 | A1* | 7/2013 | Chen .................... H04N 19/597 348/43 |

FOREIGN PATENT DOCUMENTS

| KR | 10-2007-0111947 A | 11/2007 |
| KR | 10-2008-0042652 A | 5/2008 |
| KR | 10-2010-0032390 A | 3/2010 |
| KR | 10-2010-0105877 A | 9/2010 |
| KR | 10-2012-0084629 A | 7/2012 |

OTHER PUBLICATIONS

G. Bang et al., "Description of 3D video coding technology proposal by ETRI and Kwangwoon University", 98. *MPEG meeting; (Motion Picture Expert Group or ISO/IEC JTC1/SC29/WG11)*, Geneva, CH, Nov. 2011. (26 pages in English).

T. Uchiumi et al., "3D-CE5.h related: Simplification of depth-based inter-view prediction", 101. *MPEG meeting; (Motion Picture Expert Group or ISO/IEC JTC1/SC29/WG11)*, Stockholm, SE, Jul. 2012 (3 pages in English).

J. Lee et al., "3D-CE5.h related results on improved residual prediction", 101. *MPEG meeting; (Motion Picture Expert Group or ISO/IEC JTC1/SC29/WG11)*, Stockholm, SE, Jul. 2012 (2 pages in English).

The Extended European Search Report dated Mar. 21, 2016 in counterpart European Application No. 13845666.0 (7 pages in English).

Hannuksela, Miska M. "Suggestion for a depth-enhanced multiview video coding extension to H. 264 Annex A: Nokia 3DV Test Model (3DV-TM) Codec Description and Simulation Results." San Jose, CA, Feb. 2012 (14 pages in English).

Tadashi Uchiumi et al., "3D-CE5.h related: Simplification of depth-based inter-view prediction", MPEG meeting; (Motion Picture Expert Group or ISO/IEC JTC1/SC29/WG11), Stockholm, SE, Jul. 2012 (2 pages in English).

Hannuksela, Miska M. et al., "3D-AVC Draft Text 3" MPEG; (Joint Collaborative Team on 3D Video Coding Extension Development of ITU-T SG 16 WP3 and ISO/IEC JTC 1/SC 29/WG11), Stockholm, SE, Jul. 2012 (11 pages in English).

Chinese Office Action dated Jul. 26, 2017 in corresponding Chinese Patent Application No. 201380063393.4 (8 pages in English and 9 pages in Chinese).

Hannuksela, Miska M, et al. "3D-AVC Draft Text 3", *Joint Collaborative Team on 3D Video Coding Extension Development of ITU-T SG 16 WP 3 and ISO/IEC JTC 1/SC 29/WG 11*, $1^{st}$ meeting, Stockholm. Sweden, Jul. 16-20, 2012 (7 pages in English and 1 pages in Japanese).

Uchiumi, Tadashi, et al. "3D-CE5.h related: Simplification of depth-based inter-view prediction", *Joint Collaborative Team on 3D Video Coding Extension Development of ITU-T SG 16 WP 3 and ISO/IEC JTC 1/SC 29/WG 11*, 1st meeting, Stockholm, Sweden, Jul. 16-20, 2012 (4 pages in English and 1 pages in Japanese).

Japanese Office Action dated Feb. 23, 2018 in corresponding Japanese patent application No. 2017-041913 (4 pages in Japanese).

* cited by examiner (a) REAL IMAGE (b) DEPTH MAP

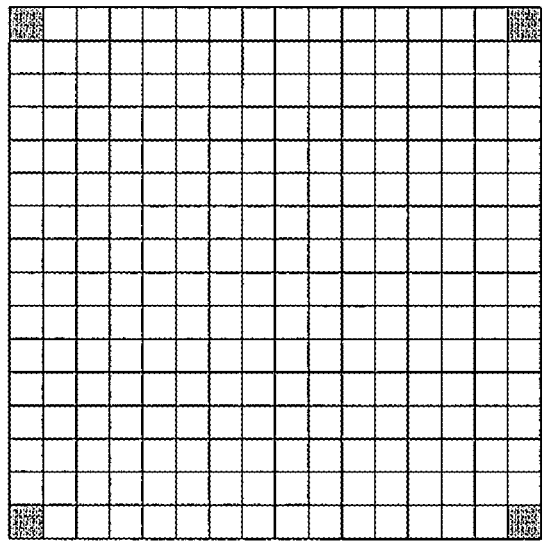
FIG. 8
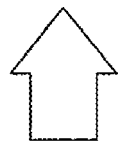
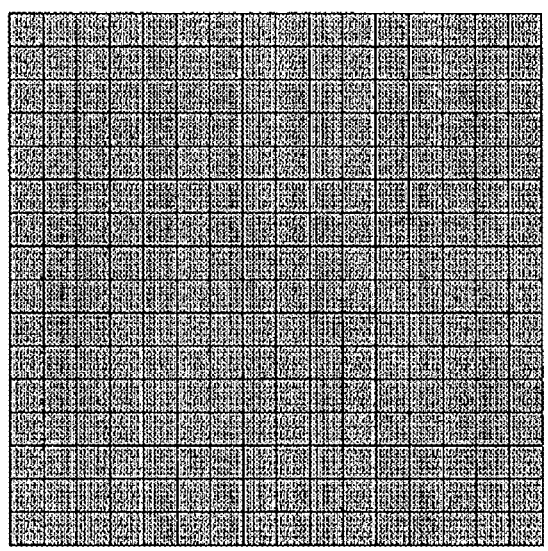

FIG. 19

| INDEX | DEPTH VALUE |
|---|---|
| 0 | valueDepth 0 |
| 1 | valueDepth 1 |
| 2 | valueDepth 2 |
| 3 | valueDepth 3 |

FIG. 20

| DEPTH OF CU (OR PU OR TU) REPRESENTING APPLICATION RANGE | METHOD A | METHOD B | METHOD C |
|---|---|---|---|
| 0 | X | O | X |
| 1 | X | O | X |
| 2 | O | O | O |
| 3 | O | X | X |
| 4 OR MORE | O | X | X |

VIDEO DATA DECODING METHOD AND VIDEO DATA DECODING APPARATUS

CROSS-REFERENCE TO RELATED APPLICATIONS

This application is a U.S. National Stage Application of International Application No. PCT/KR2013/009000, filed on Oct. 8, 2013, which claims the benefit under 35 USC 119(a) and 365(b) of Korean Patent Application No. 10-2012-0112063, filed on Oct. 9, 2012, Korean Patent Application No. 10-2012-0114096, filed on Oct. 15, 2012, Korean Patent Application No. 10-2013-0006176, filed on Jan. 18, 2013, and Korean Patent Application No. 10-2013-0006727, filed on Jan. 21, 2013 in the Korean Intellectual Property Office.

TECHNICAL FIELD

The present invention relates to a method and apparatus for decoding video data.

BACKGROUND ART 3D video provides a 3D effect to a user so as to see and feel reality through a 3D stereoscopic display device. In this relation, research into a 3D video standard by the Joint Collaborative Team on 3D Video Coding Extension Development, which is a joint standardization group of the Moving Picture Experts Group (MPEG) of ISO/IEC and the Video Coding Experts Group (VCEG) of ITU-T is underway. The 3D video standard includes a standard of an advanced data format supporting reproduction of an autostereoscopic image as well as a stereoscopic image using a real image and a depth map thereof and a technique related thereto.

DISCLOSURE

Technical Problem

An object of the present invention is to provide a method and apparatus for decoding video data which may easily produce motion data from 3D video data.

Another object of the present invention is to provide a method and apparatus for decoding video data which may increase data processing efficiency in encoding or decoding of video data.

A further object of the present invention is to provide a method and apparatus for decoding video data which may increase memory efficiency and decrease complexity in encoding or decoding of video data.

Technical Solution

In one embodiment of the present invention, a method for decoding video data includes receiving coded video data including multi-view video data and depth data corresponding to the video data, acquiring motion data for inter-view prediction of a coding unit of the coded video data from the depth data, and performing inter-view prediction based on the motion data, and restoring video data according to the multi-view video data including the coding unit and the depth data based on the motion prediction.

The motion data may be calculated based a depth map picture referred by the coding unit and at least one of position information of the left uppermost sample, right uppermost sample, left lowermost sample, and right lowermost sample of the coding unit.

The motion data may be calculated further using a view identifier of the depth map picture or a view identifier of a picture including the coding unit.

The motion data may be calculated using the maximum disparity of depth values in a depth map picture referred to by the coding unit.

The restoration of the video data may include outputting decoding samples according to the video data and the depth data corresponding to the video data.

The coding unit may include a macroblock, or one of a coding unit, a prediction unit, and a transform unit which are defined in High Efficiency Video Coding (HEVC).

The acquisition of the motion data may include calculating motion data of coding units adjacent to the coding unit using depth values included in a depth map picture referred to by the coding unit.

In another embodiment of the present invention, a system for decoding video data includes a reception unit receiving and parsing coded video data including multi-view video data and depth data corresponding to the video data, a prediction unit acquiring motion data for inter-view prediction of a coding unit of the coded video data from the depth data, and performing inter-view prediction based on the motion data, and a restoration unit restoring video data according to the multi-view video data including the coding unit and the depth data based on the motion prediction.

Advantageous Effects

In accordance with the present invention, motion data may be easily calculated from video data.

In accordance with the present invention, a method and apparatus for decoding video data which may increase video data processing efficiency in encoding or decoding of video data is provided.

In accordance with the present invention, memory efficiency may be increased and complexity may be decreased in encoding or decoding of video data.

In accordance with the present invention, when a depth-based motion vector prediction (DMVP) method is used, plural blocks within a random area use in common one depth value so as to derive motion data and thus, the number of times of access to depth values of depth map blocks is greatly reduced, thereby greatly increasing memory efficiency and decreasing complexity.

DESCRIPTION OF DRAWINGS

FIG. 8 is a view illustrating a 16×16 block in accordance with one embodiment of the present invention;

FIG. 19 is a view illustrating one example of representative depth values in a picture unit;

FIG. 20 is a table illustrating one example of application range determination methods of embodiments of the present invention, if a given CU (or TU) depth is 2;

BEST MODE

Hereinafter, embodiments of the present invention will be described with reference to the annexed drawings.

Figure 1:
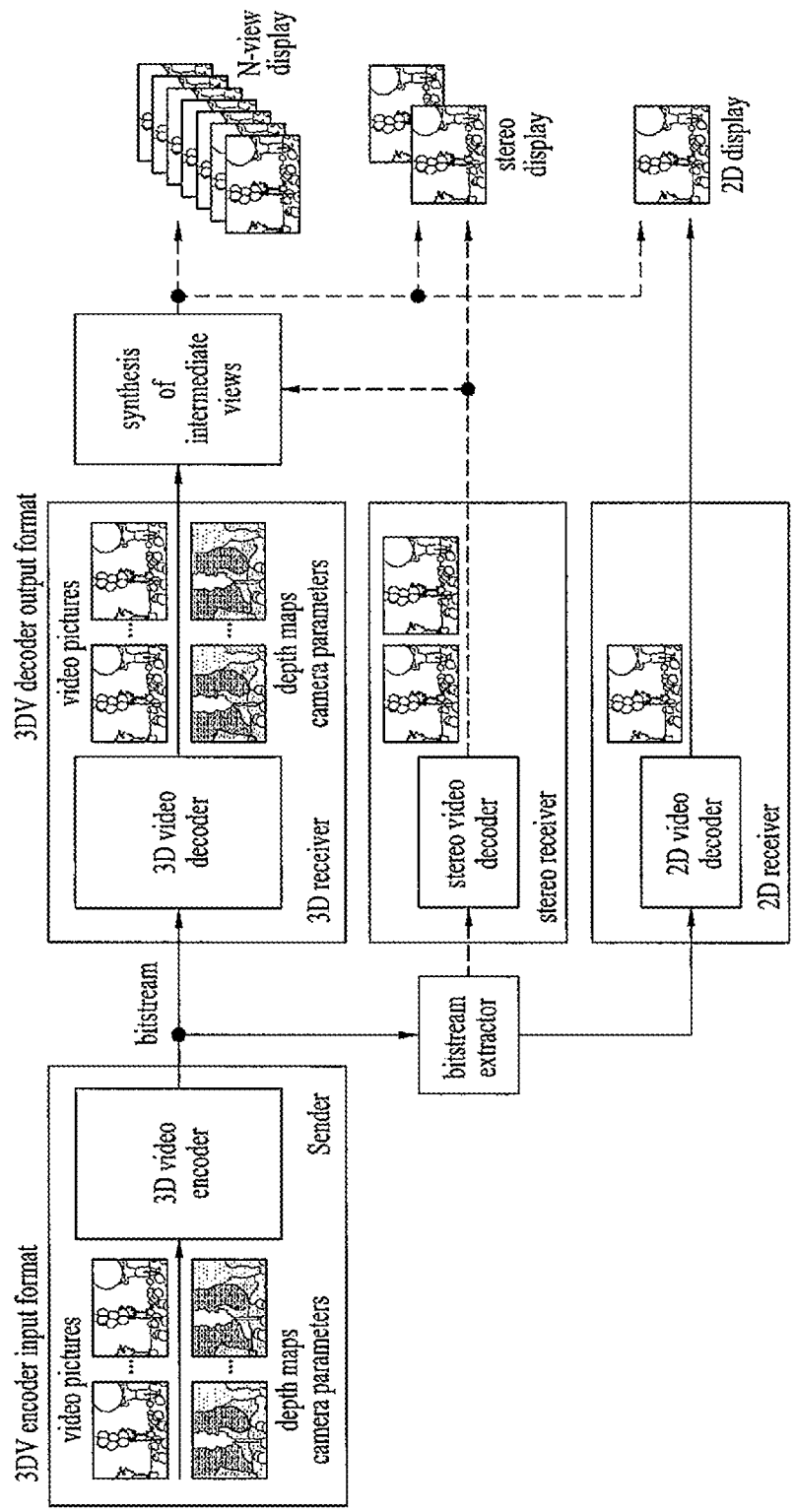
FIG. 1 is a view illustrating the basic structure and data format of a 3D video system.

FIG. 1 is a view illustrating the basic structure and data format of a 3D video system.

The basic 3D video system considered in the 3D video standard is shown in FIG. 1. A sender side acquires N-viewpoint image contents (N≥2) using a stereo camera, a depth information camera, and other camera and conversion of a 2D image into a 3D image. The acquired image contents may include N-viewpoint video information, depth map information thereof, and camera-related additional information. The N-viewpoint image contents are compressed using a video encoding method, and a compressed bitstream is transmitted to a terminal through a network.

A receiver side restores N-viewpoint images by decoding the received bitstream using a video decoding method. The restored N-viewpoint images generate virtual viewpoint images of N-viewpoints or more through depth-image-based rendering (DIBR). The generated virtual viewpoint images of N-viewpoints or more are reproduced according to various stereoscopic display systems, thus providing images having a 3D effect to users.

The depth map used in generation of the virtual viewpoint image expresses a real distance between a camera and a real object (depth information corresponding to each pixel at the same resolution as a real image) as a designated bit number.

Figure 2:
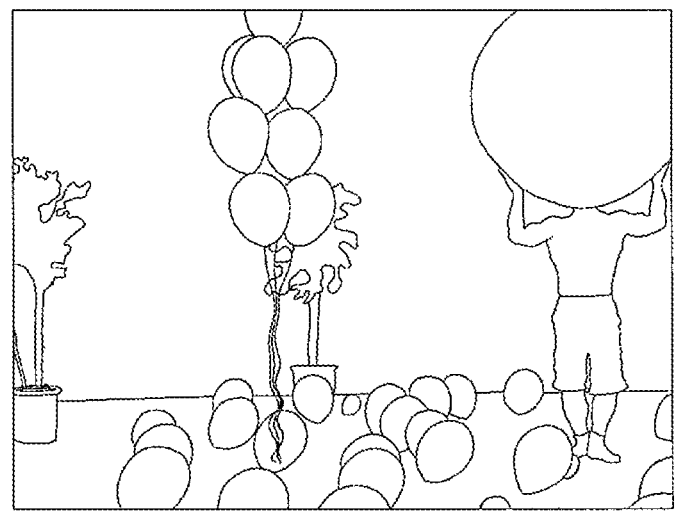
FIGS. 2(a) and 2(b) are views illustrating a "balloons" image and a depth map thereof, being used in a 3D video coding standard of the MPEG of ISO.
Figure 2:
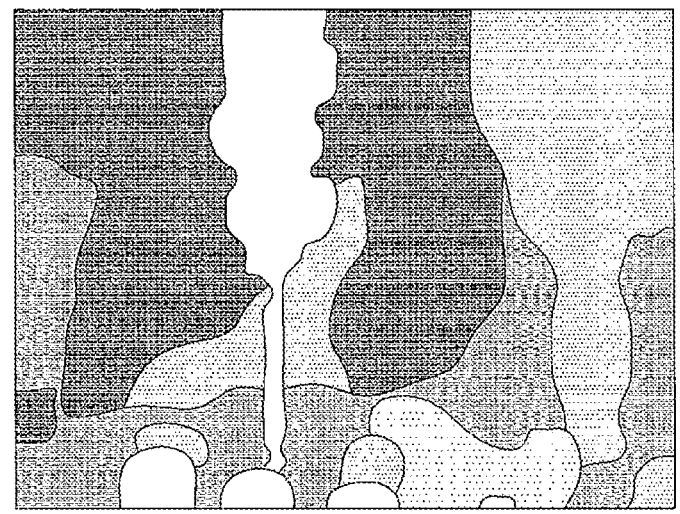

As one example of the depth map, FIGS. 2(a) and 2(b) illustrate a "balloons" image and a depth map thereof, being used in a 3D video coding standard of the MPEG of ISO. The depth map of FIG. 2(b) may express depth information shown therein as 8 bits per pixel.

FIG. 2(a) illustrates the real image of the "balloons" image, and FIG. 2(b) illustrates the depth map of the "balloons" image, respectively.

Figure 3:
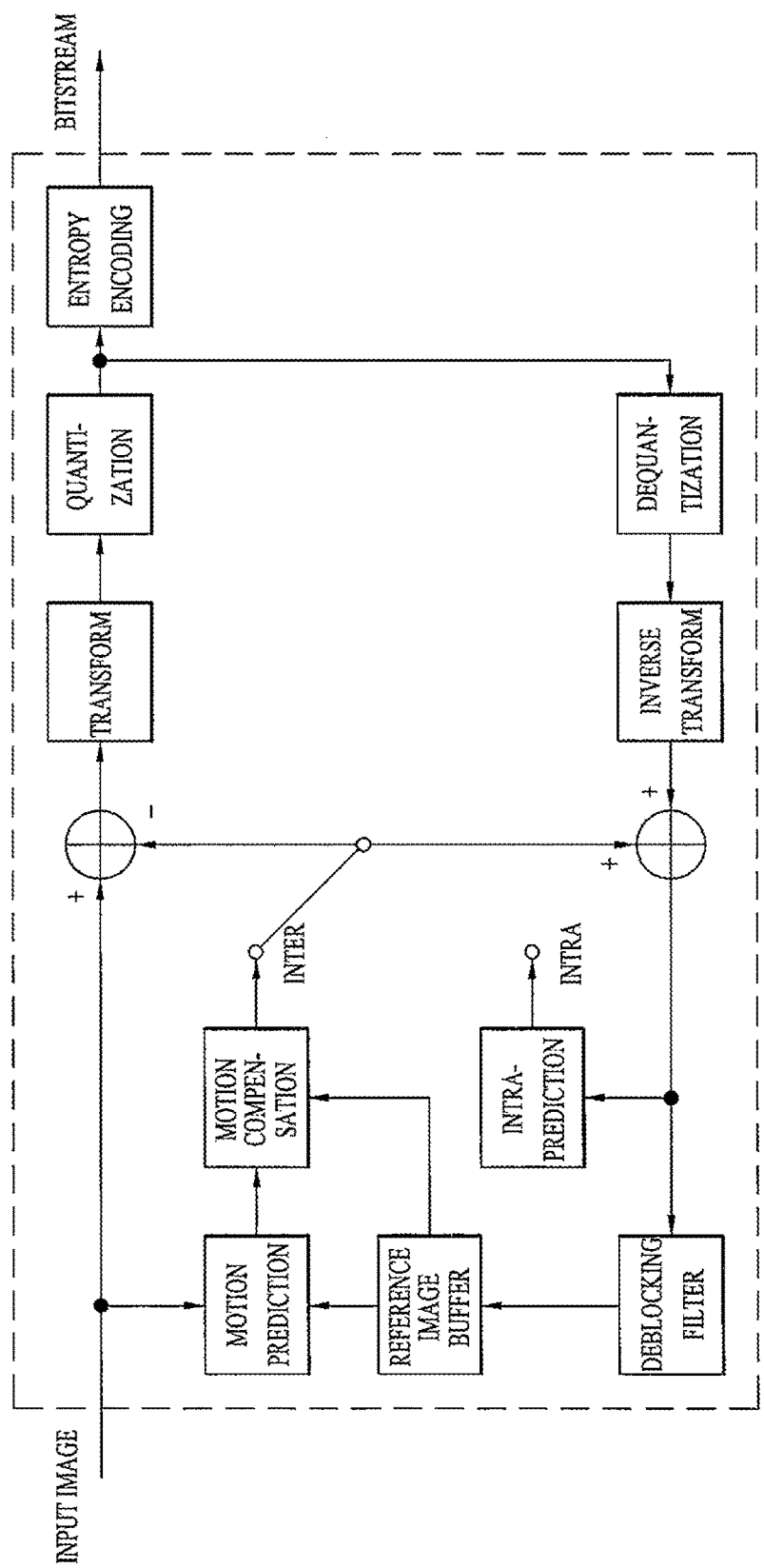
FIG. 3 is a view illustrating one example of an encoding structure of H.264.

As one method of encoding a real image and a depth map thereof, MPEG-4 Part 10 Advanced Video Coding (H.264/AVC), i.e., a video coding method having the highest coding efficiency among video coding standards which have been developed to data, may be used, and one example of an encoding structure of H.264 is shown in FIG. 3.

FIG. 3 is a view illustrating one example of the encoding structure of H.264.

In the encoding structure of H.264, a unit of processing data may be a macroblock having a size of 16×16 pixels, and receives an image, performs encoding in an intra-mode or an inter mode, and outputs a bitstream.

In the intra-mode, a switch is transformed into the intra-mode, and, in the inter mode, the switch is transformed into the inter mode. As the main flow of the encoding process, a prediction block of an input block image is first generated, a difference between the input block and prediction block is calculated, and the difference is encoded.

First, generation of the prediction block is performed according to the intra-mode and the inter mode. In the intra-mode, a prediction block is generated through spatial prediction using circumferential pixel values which have been encoded in advance during an intra-prediction process, and, in the inter mode, a prediction block is generated by calculating a motion vector by searching a region of a reference image stored in a reference image buffer during a movement prediction process, which optimally matches with the input block, and performing motion compensation using the calculated motion vector. Then, in the same manner, a residual block is generated by calculating the difference between the input block and the prediction block, and then, encoding of the residual block is performed. Block encoding is generally divided into the intra-mode and the inter mode. According to the size of the prediction block, the intra-mode may be divided into 16×16, 8×8, and 4×4 intra-modes, the inter mode may be divided into 16×16, 16×8, 8×16, and 8×8 inter modes, and the 8×8 inter mode may be divided into 8×8, 8×4, 4×8, and 4×4 sub-inter mode.

Encoding of the residual block is performed in order of transform, quantization, and entropy encoding. First, a block encoded in the 16×16 intra-mode performs transform of a residual block, outputs transform coefficients, performs Hadamard transform of only DC coefficients among the output transform coefficients, and outputs Hadamard transform coefficients. In case of blocks encoded in other encoded modes except for the 16×16 intra-mode, the input residual block is received, transform of the block is performed, and transform coefficients are output. Then, in the quantization process, the input transform coefficients are quantized according to quantization parameters, and then quantized coefficients are output. Further, in the entropy encoding process, entropy encoding of the input quantized coefficients according to probability distribution is performed, and encoded coefficients are output as a bitstream.

In H.264, since inter-frame prediction encoding is performed, a current encoded image needs to be decoded and stored so as to be used as a reference image of a subsequent input image. Therefore, a reconfigured block is generated through the prediction image and an adder by performing dequantization and inverse transform of the quantized coefficients, blocking artifacts generated during the encoding process are eliminated from the reconfigured block through a deblocking filter, and the reconfigured block is stored in the reference image buffer.

Figure 4:
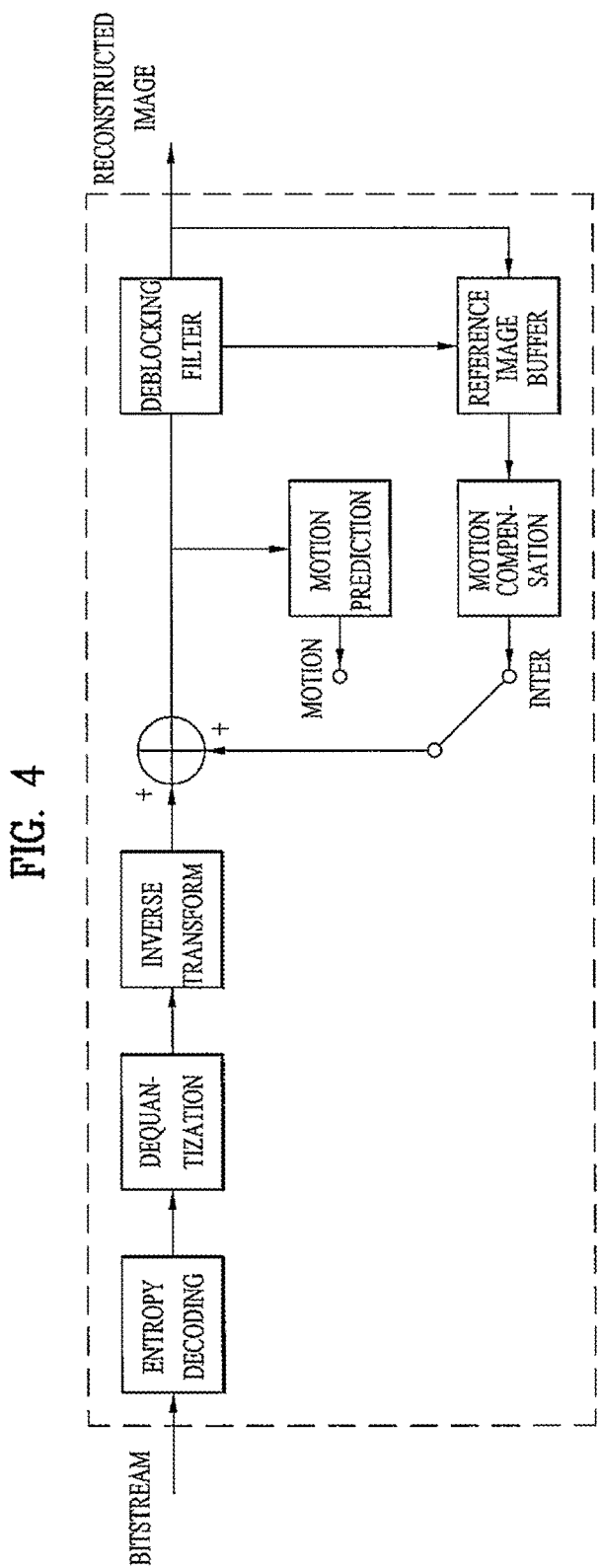
FIG. 4 is a view illustrating one example of a decoding structure of H.264.

FIG. 4 is a view illustrating one example of a decoding structure of H.264.

In the decoding structure of H.264, a unit to process data may be a macroblock having a size of 16×16 pixels, and receives a bitstream, performs decoding in the intra-mode or the inter mode, and outputs a reconfigured image.

In the intra-mode, a switch is transformed into the intra-mode, and, in the inter mode, the switch is transformed into the inter mode. As the main flow of the decoding process, a prediction block is first generated, and a reconfigured block is generated by adding a resultant block acquired by decoding the bitstream and the prediction block. First, generation of the prediction block is performed according to the intra-mode and the inter mode. In the intra-mode, a prediction block is generated through spatial prediction using circumferential pixel values which have been encoded in advance during the intra-prediction process, and, in the inter mode, a prediction block is generated by performing motion compensation of a region of the reference image stored in the reference image buffer using the calculated motion vector.

In an entropy decoding process, entropy decoding of the input bitstream according to probability distribution is performed, and quantized coefficients are output. The reconfigured block is generated through the prediction image and an adder by performing dequantization and inverse transform of the quantized coefficients, blocking artifacts generated during the encoding process are eliminated from the reconfigured block through a deblocking filter, and the reconfigured block is stored in the reference image buffer.

As another method of coding a real image and a depth map thereof, High Efficiency Video Coding (HEVC), standardization of which is underway by the Moving Picture Experts Group (MPEG) and the Video Coding Experts Group (VCEG), may be used. It may provide a high-quality image at a lower frequency than that which is used now even in a 3D broadcast and a mobile communication network as well as HD and UHD images.

When a real image and a depth map thereof are coded, the real image and the depth map thereof may be encoded/decoded independently. Further, a real image and a depth map thereof are coded, the real image and the depth map thereof may be encoded/decoded dependently.

Figure 5:
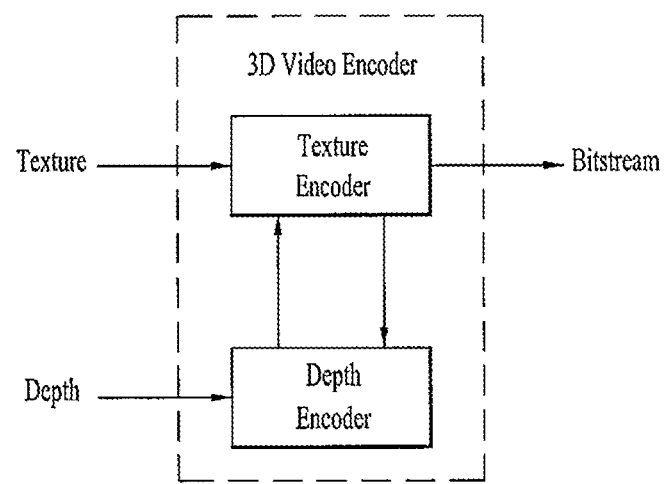
FIG. 5 is a view illustrating a 3D video encoder/decoder in accordance with one embodiment.
Figure 5:
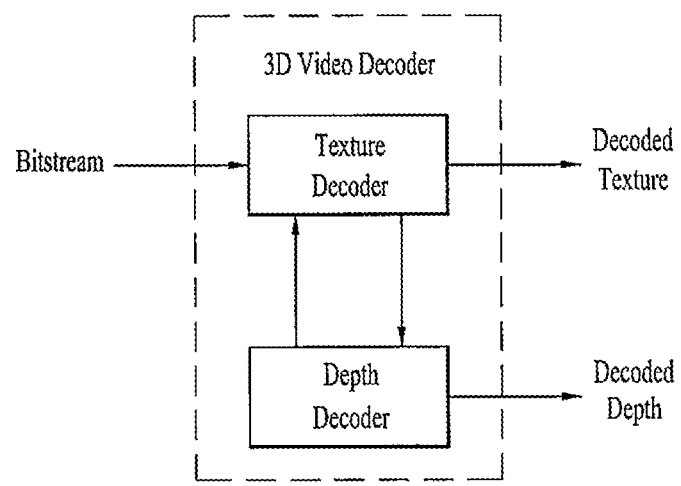

FIG. 5 is a view illustrating a 3D video encoder/decoder in accordance with one embodiment.

For example, a real image may be encoded/decoded using a depth map which has been encoded/decoded in advance, and, on the other hand, a depth map may be encoded/decoded using a real image which has been encoded/decoded in advance.

The encoder performs encoding of a texture and a depth map through a texture encoder and a depth encoder according to information, and then outputs a bitstream.

On the other hand, the decoder may perform decoding of the received bitstream into a texture and a depth map through a texture decoder and a depth decoder according to information.

Real images and depth maps thereof may be acquired by plural cameras as well as one camera. In accordance with one embodiment, an encoding prediction structure to encode real images acquired by three cameras and depth maps thereof is shown in FIG. 6.

Figure 6:
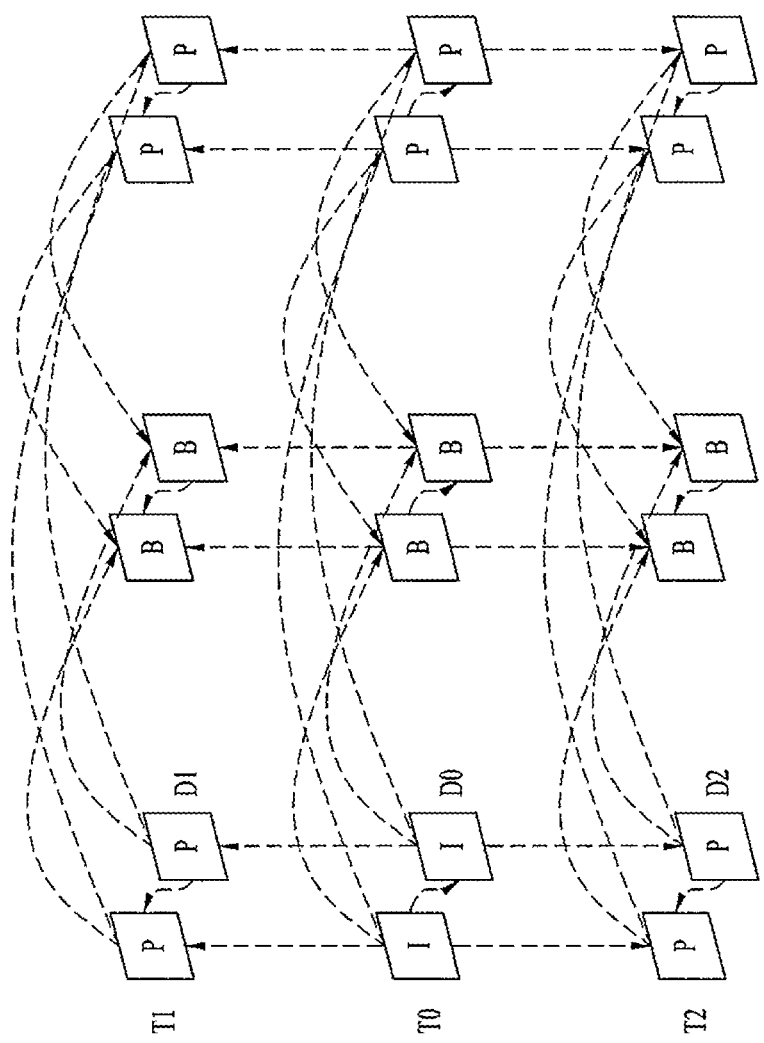
FIG. 6 is a view exemplarily illustrating referential relations between video data and depth data.

FIG. 6 illustrates three real images T0, T1, and T2 according to viewpoints, and illustrates three depth maps D0, D1, and D2 at the same positions of the real images T0, T1, and T2 according to viewpoints. Respective pictures may be encoded to I (Intra-Picture), P (Uni-prediction Picture), and B (Bi-prediction Picture). In FIG. 6, an arrow represents a prediction direction. That is, the real image and the depth map thereof are encoded/decoded dependently.

FIG. 6 illustrates one example of a prediction structure of a 3D video codec.

Methods to analogize motion data of a current block from a real image are generally divided into temporal prediction and inter-view prediction. Here, motion data may mean only a motion vector, or mean a motion vector, a reference image number, whether or not prediction corresponds to uni-directional prediction or bi-directional prediction, and whether or not prediction corresponds to inter-view prediction, temporal prediction, or another type of prediction.

Temporal prediction is a prediction method using temporal correlation within the same viewpoint, and inter-view prediction is a prediction method using inter-view correlation at adjacent viewpoints. Both temporal prediction and inter-view prediction may be used together in one picture.

Figure 7:
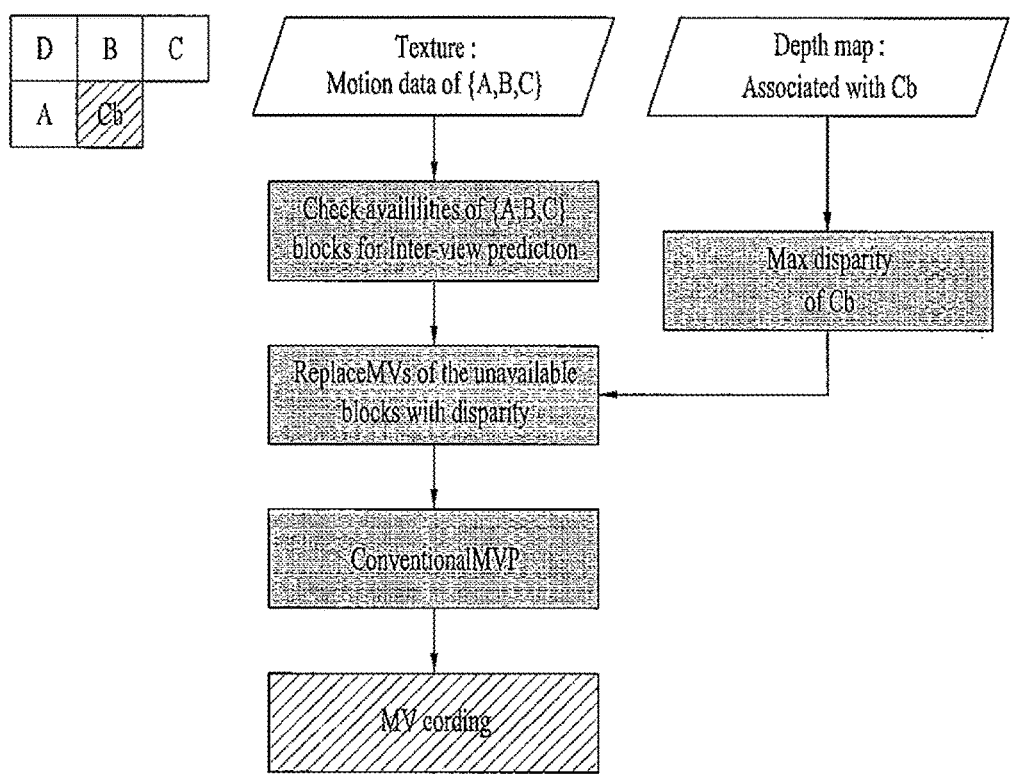
FIG. 7 is a view illustrating analogy of motion data through circumferential blocks adjacent to a current block in accordance with one embodiment.

FIG. 7 is a view illustrating analogy of motion data through circumferential blocks adjacent to a current block in accordance with one embodiment.

In accordance with one embodiment, as exemplarily shown in FIG. 7, the current block may encode/decode motion data using inter-view prediction. In this case, whether or not circumferential blocks A, B, C, and D adjacent to the current block are available for inter-view prediction is checked first.

If the circumferential blocks A, B, C, and D adjacent to the current block are available for inter-view prediction, motion data of the current block is derived using motion data of the corresponding blocks. Otherwise (if the circumferential blocks A, B, C, and D adjacent to the current block are not available for inter-view prediction), motion data of the corresponding blocks (the circumferential blocks A, B, C, and D adjacent to the current block) is replaced with other motion data. Here, a depth-based motion vector prediction (DMVP) method in which other motion data is generated using a depth map corresponding to (coinciding with) the circumferential blocks A, B, C, and D adjacent to the current block may be used.

In such a method, motion data for the current block (a block in a real image) is generated using max disparity of depth values of depth map blocks corresponding to (coinciding with) the circumferential blocks A, B, C, and D adjacent to the current block. It uses the fact that a depth value in the depth map represents inter-view distance disparity of an object.

Motion data of the finally derived current block (a block in a real image) is derived using motion data of the circumferential blocks A, B, C, and D adjacent to the current block. In accordance with one embodiment, motion data of the current block (the block in the real image) is derived through calculation of the median of motion data of the circumferential blocks A, B, C, and D adjacent to the current block.

In accordance with another embodiment, a current block may be encoded/decoded using temporal prediction. In this case, whether or not circumferential blocks A, B, C, and D adjacent to the current block are available for inter-view prediction is checked. If the circumferential blocks A, B, C, and D adjacent to the current block are available for inter-view prediction, motion data of the corresponding blocks is used. Otherwise (if the circumferential blocks A, B, C, and D adjacent to the current block are not available for inter-view prediction), motion data of the corresponding blocks (the circumferential blocks A, B, C, and D adjacent to the current block) is replaced with a zero-vector.

In order to acquire max disparity of depth values of depth map blocks corresponding to (coinciding with) the circumferential blocks A, B, C, and D adjacent to the current block using the depth-based motion vector prediction (DMVP) method, access to all depth values of the depth map blocks and comparison between all the depth values of the respective depth map blocks are required. Since a depth map is required when a real image is encoded, dependence between the real image and the depth map is present.

FIG. 8 is a view illustrating a 16×16 block in accordance with one embodiment of the present invention.

In accordance with one embodiment, if a block (a block in a real image) shown at the left of FIG. 8 has the size of a 16×16 block, a depth map may have the size of a 16×16 block also. Therefore, access to depth values 256 times and comparison between the depth values 255 times need to be performed. Since access to all the depth values of the depth map is required, such a method is inefficient in terms of memory efficiency and complexity. In order to solve such problems, as illustrated in a block shown at the right of FIG. 8, among 256 depth values 256 of the 16×16 block, only four depth values located at the corners of the block may be used.

The above method greatly reduces the number of times of access to depth values from 256 to 4, thus increasing memory efficiency, and greatly reduces the number of comparison from 255 to 3, thud decreasing complexity.

Figure 9:
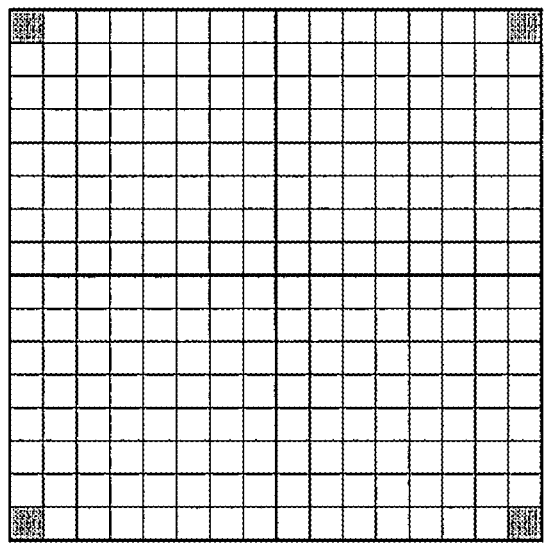
FIG. 9 is a view illustrating one example of division of a 16×16 block into 8×8 blocks.

However, in 8×8 blocks other than the 16×16 block, since 4 depth values of each of the 8×8 blocks need to be used, access to 16 depth values other than 4 depth values is performed and thus, max disparity of the depth values may be acquired, as exemplarily shown in FIG. 9.

Figure 10:
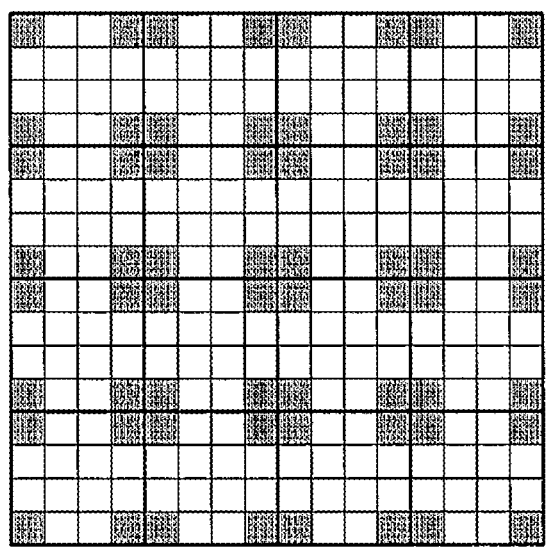
FIG. 10 is a view illustrating one example of division of a 16×16 block into 4×4 blocks.

FIG. 9 is a view illustrating one example of division of a 16×16 block into 8×8 blocks, and FIG. 10 is a view illustrating one example of division of a 16×16 block into 4×4 blocks.

Further, in 4×4 blocks, since 4 depth values of each of the 4×4 blocks need to be used, access to 64 depth values is performed and thus, max disparity of the depth values may be acquired, as exemplarily shown in FIG. 10.

For example, in case of an image having high complexity and fast motion, there is a strong possibility that one 16×16 block is divided into 4×4 blocks so as to perform encoding. Therefore, since access to 64 depth values is performed per the 16×16 block, as needed, division of the 16×16 block into 4×4 blocks is inefficient in terms of memory efficiency.

In the present invention, a method of enhancing memory efficiency if frequent access to depth values is required when an image is encoded/decoded is proposed, as shown in the 4×4 blocks of FIG. 10.

Figure 11:
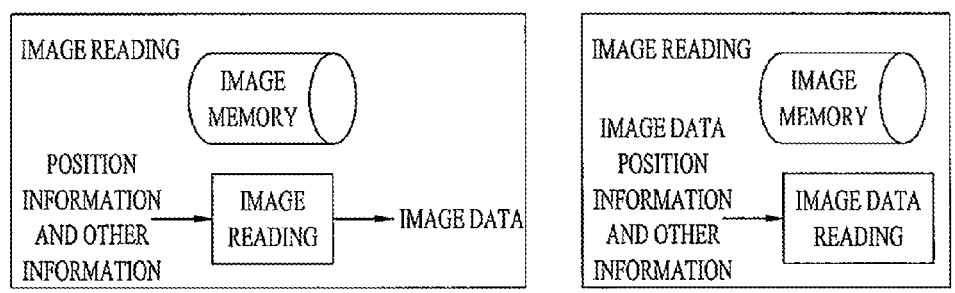
FIG. 11 is a view illustrating a method of enhancing memory efficiency of image data in accordance with one embodiment.

FIG. 11 is a view illustrating a method of enhancing memory efficiency of image data in accordance with one embodiment. In "image reading" of FIG. 11, in order to reduce the number of times of memory access to read data of the block size (or a random shape) present in an image memory, data of the overall block size is not read, but some data may be read from the block or one pixel value (or one or more pixel values) may be read from the block using position information and other information.

Further, in "image writing" of FIG. 11, in order to reduce the number of times of memory access to write data of the block size (or a random shape) in the image memory, data of the overall block size is not written, but one pixel value (or one or more pixel values) may be written using position information and other information.

Further, in the present invention, when the depth-based motion vector prediction (DMVP) method is used, a method of increasing memory efficiency and decreasing complexity by greatly decreasing the number of times of access to depth values of the depth map block is proposed.

Figure 12:
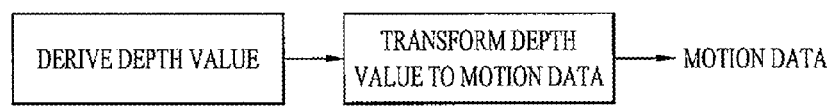
FIG. 12 is a view illustrating a process of deducing motion data using depth values in accordance with one embodiment.

FIG. 12 is a view illustrating a process of deducing motion data using depth values in accordance with one embodiment.

That is, FIG. 12 illustrates a process of deducing motion data of circumferential blocks adjacent to a current block (or motion data of the current block) using depth values, when the depth-based motion vector prediction (DMVP) method is used. Here, various methods of deriving depth values may be applied.

In accordance with one embodiment, in a depth map having the same viewpoint as a picture of a current block (the block in the real image), depth values in depth map blocks corresponding to circumferential blocks A, B, C, and D adjacent to the current block may be used.

In accordance with another embodiment, in a depth map having the same viewpoint as a picture of a current block (the block in the real image), depth values in a depth map block corresponding to the current block may be used.

In accordance with another embodiment, in a depth map having a viewpoint differing from a picture of a current block (the block in the real image) (for example, a viewpoint adjacent to the current viewpoint), depth values in depth map blocks corresponding to circumferential blocks A, B, C, and D adjacent to the current block may be used. At this time, in order to find the depth map blocks corresponding to the circumferential blocks A, B, C, and D adjacent to the current block, depth map blocks located at positions moved by an inter-view distance in the depth map may be used.

In accordance with another embodiment, in a depth map having a viewpoint differing from a picture of a current block (the block in the real image) (for example, a viewpoint adjacent to the current viewpoint), depth values in a depth map block corresponding to the current block may be used. At this time, in order to find the depth map block corresponding to the current block (the block in the real image), a depth map block located at a position moved by an inter-view distance in the depth map may be used.

In accordance with another embodiment, a depth map is not used to derive depth values, but values similar to depth values may be derived through inter-view differences or motion data differences between real images and depth values may be replaced with these values. Further, depth values are not derived, but motion data may be directly derived through inter-view differences or motion data differences between real images.

Figure 13:
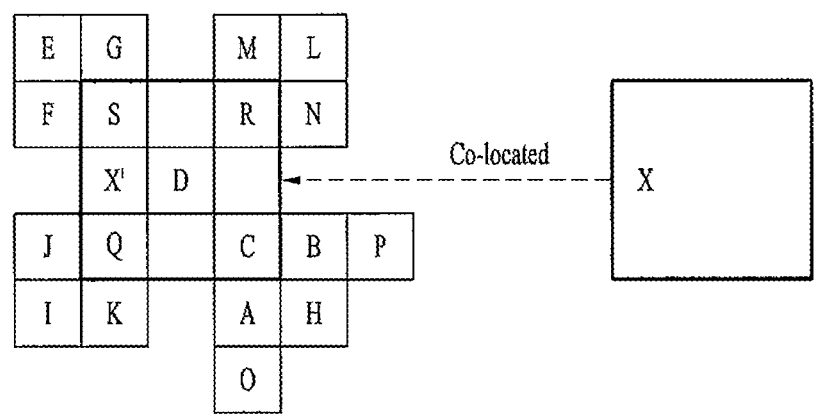
FIG. 13 is a view illustrating a position to acquire depth values from a depth map block corresponding to a current block (a block in a real image) in accordance with one embodiment.

FIG. 13 is a view illustrating a position to acquire depth values from a depth map block corresponding to a current block (a block in a real image) in accordance with one embodiment.

First, as exemplarily shown in FIG. 13, a position to acquire depth values in a depth map block X' corresponding to a circumferential block X adjacent to a current block (or the current block) may be variously selected from A, B, C, D, E, F, G, H, I, J, K, L, M, N, O, P, Q, R, and S.

Further, depth values of circumferential blocks of the depth map block X' corresponding to the circumferential block X adjacent to the current block (or the current block) may be used. In accordance with one embodiment, blocks adjacent to the depth map block X' corresponding to the circumferential block X adjacent to the current block (or the current block), i.e., blocks located at the left, the right, the top, the bottom, the top of the left, the top of the right, the bottom of the left, and the bottom of the right of the depth map block X' corresponding to the circumferential block X adjacent to the current block (or the current block), may be used.

In accordance with one embodiment, motion data may be derived using only one of plural depth values of the depth map block X' corresponding to the circumferential block X adjacent to the current block (or the current block) in FIG. 13. That is, motion data is derived using only one depth value for each of circumferential blocks adjacent to the current block (or the current block). In this case, since access to only 1 depth value for each of 4×4 blocks is performed, as exemplarily shown in FIG. 14, access to 16 depth values in a 16×16 block is performed.

Figure 14:
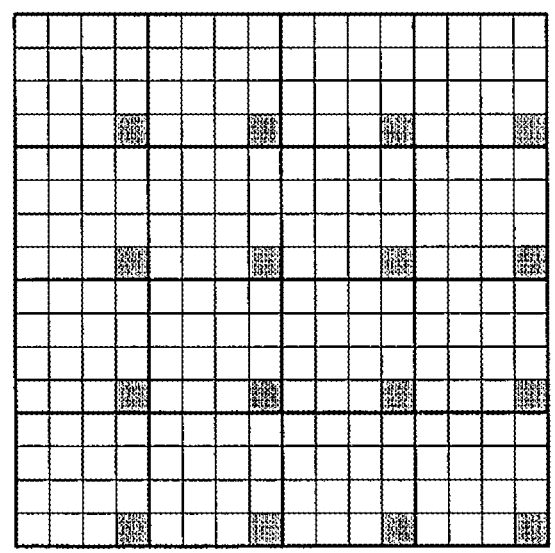
FIG. 14 is a view illustrating one example of division of a 16×16 block into 4×4 blocks.

FIG. 14 is a view illustrating one example of division of a 16×16 block into 4×4 blocks.

Since, in general, the lowermost right pixel is statistically frequently selected for each 4×4 block, a depth value corresponding to such a position for each 4×4 block may be used in derivation of motion data without comparing operation.

Further, in accordance with another embodiment, several blocks in common within a random area (or a specific area) of a real image may use one depth value in common in derivation of motion data. In accordance with one embodiment, the random area of the real image may be set in the unit of a macroblock. In this case, when the macroblock is divided into plural blocks, all blocks may use one depth value in derivation of motion data. Such a random area of the real image may be a sub-block as well as the macroblock, or be a group of the macroblock. Further, in case of High Efficiency Video Coding (HEVC), standardization of which is underway by the Moving Picture Experts Group (MPEG) and the Video Coding Experts Group (VCEG), the random area may be a coding unit (CU), a prediction unit (PU), a transform unit (TU), or a group of the CU.

Figure 15:
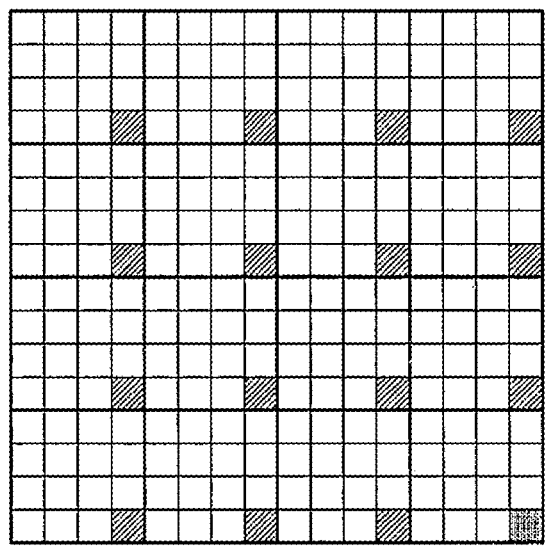
FIG. 15 is a view illustrating another example of division of a 16×16 block into 4×4 blocks.
Figure 16:
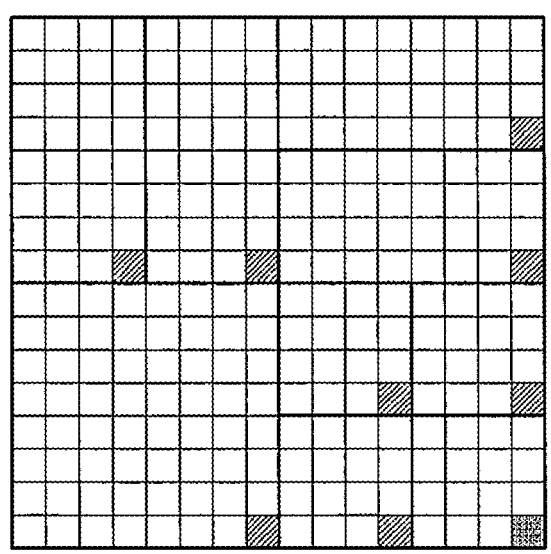
FIG. 16 is a view illustrating one example of division of a 16×16 block into plural blocks having randomly different shapes.
Figure 17:
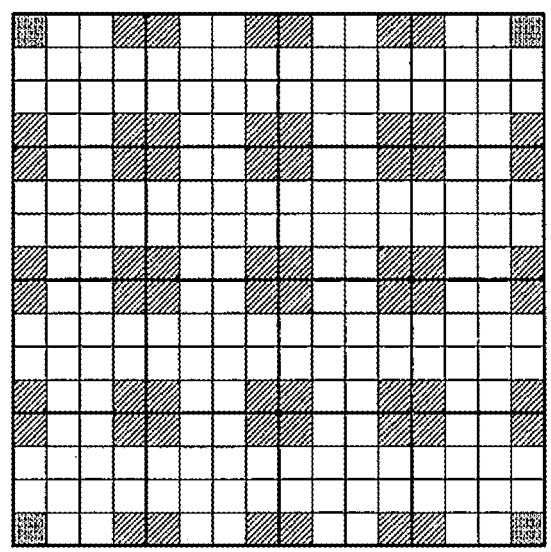
FIG. 17 is a view illustrating one example of division of a 16×16 block into plural blocks having the same shape.

FIG. 15 is a view illustrating another example of division of a 16×16 block into 4×4 blocks, FIG. 16 is a view illustrating one example of division of a 16×16 block into blocks having randomly different shapes, and FIG. 17 is a view illustrating one example of division of a 16×16 block into blocks having the same shape.

In accordance with one embodiment, if each of circumferential blocks adjacent to a current block (or the current block) has a position of one of 4×4 blocks shown in FIG. 15, a depth map block corresponding to the corresponding block (a block in a real image) may not use a depth value indicated by oblique lines in each 4×4 block, but may use in common only a depth value of a dark portion located at the lowermost region of the right portion of the 16×16 block.

In this case, as exemplarily shown in FIG. 15, since 16 4×4 blocks perform access to only 1 depth value (1 depth value in the 16×16 block), a memory bandwidth may be greatly reduced. Further, as exemplarily shown in FIG. 16, if each of circumferential blocks adjacent to a current block (or the current block) is one of blocks having randomly different shapes, a depth map block corresponding to the corresponding block (a block in a real image) may not use a depth value indicated by oblique lines in each block, but may use in common only a depth value of a dark portion located at the lowermost region of the right portion of the 16×16 block.

In accordance with another embodiment, if correlation between depth values located at the lowermost regions of the right portions of respective blocks is checked and a difference therebetween does not exceed a reference value (or exceeds the reference value or is below the reference value), a depth value located at the lowermost region of the right portion of a random area (for example, a macroblock unit) may be set as a representative depth value of each block and all blocks within the random area may use in common the representative depth value in derivation of motion data.

When the current block performs inter-view prediction and all the circumferential blocks adjacent to the current block perform temporal prediction (or the circumferential blocks are ineffective or the circumferential blocks perform intra-prediction), all the circumferential blocks adjacent to the current block may derive motion data using the depth-based motion vector prediction (DMVP) method.

Figure 18:
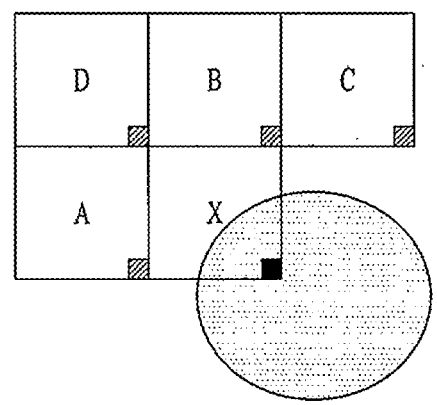
FIG. 18 is a view illustrating inter-view prediction performed by a current block X in accordance with one embodiment.

FIG. 18 is a view illustrating inter-view prediction performed by a current block X in accordance with one embodiment. In FIG. 18, in accordance with one embodiment, if the current block X performs inter-view prediction and all circumferential blocks A, B, and C of the current block X perform temporal prediction (or the circumferential blocks are ineffective or the circumferential blocks perform intra-prediction), all the circumferential blocks A, B, and C of the current block X derive motion data using the depth-based motion vector prediction (DMVP) method. At this time, the circumferential blocks A, B, and C of the current block X may derive motion data using depth values located at the lowermost regions of the right portions thereof.

In accordance with another embodiment, as exemplarily shown in FIG. 17, plural blocks in a random area (or a specific area) may use in common one of the maximum depth values (or the minimum depth values or random values) of 4 depth values located at the corners (or at random positions) of each 4×4 block, among 256 depth values of a 16×16 block, in derivation of motion data.

In accordance with one embodiment, a random area of a real image may be set in the unit a macroblock and, in this case, when the macroblock is divided into plural blocks, all blocks in the macroblock may use in common one maximum depth value (or one minimum depth value or one random value) of 4 depth values located at the corners (or at random positions) of the macroblock in derivation of motion data.

In general, a block encoded using inter-view prediction may be an object rather than a background, as exemplarily shown in FIG. 18. On the other hand, the background may be mostly encoded using temporal prediction. However, when motion data for inter-view prediction of the current block X is derived, if the circumferential blocks A, B, and C of the current block X correspond to the background rather than the object and thus motion data is derived using depth values of depth map blocks corresponding to the circumferential blocks A, B, and C, motion data of the background rather than the object may be derived. In this case, motion data of the current block X is mis-derived and encoding efficiency may be reduced.

In order to solve such a problem and increase encoding efficiency, if the current block X is encoded/decoded using inter-view prediction and the circumferential blocks A, B, and C of the current block X use temporal prediction (or the circumferential blocks are ineffective or the circumferential blocks use intra-prediction), motion data of the current block X may be derived not using depth values corresponding to the circumferential blocks A, B, and C but using a depth value corresponding to the current block X.

In accordance with one embodiment, if the current block X is encoded/decoded using inter-view prediction, when all the circumferential blocks A, B, and C of the current block X use temporal prediction (or the circumferential blocks are ineffective or the circumferential blocks use intra-prediction), motion data of the current block X may be derived using a depth value corresponding to the current block X.

In accordance with another embodiment, if the current block X is encoded/decoded using inter-view prediction, when any of the circumferential blocks A, B, and C of the current block X uses temporal prediction (or is ineffective or uses intra-prediction), motion data of the current block X may be derived using a depth value corresponding to the current block X without use of a depth value corresponding to the corresponding block.

When the depth-based motion vector prediction (DMVP) method is used, access to depth values of depth map blocks is required and thus, access to a depth map may be performed when a real image is encoded.

Therefore, dependence between the real image and the depth map is present. Such dependence may cause delay in encoding and inefficiency in terms of hardware implementation. Therefore, in order to remove such dependence, a method of signaling some of depth values used in derivation of motion data in the unit of a picture may be used. In case of the above methods, one depth value in a specific area is used in common. Such a specific area may have a 16×16 size, a 32×32 size, or a larger size. Such a specific area may be extended to the unit of a picture (or a slice or a random area), and motion data may be derived using plural depth values other than one depth value in the picture (or the slice or the random area) unit.

FIG. 19 is a view illustrating one example of representative depth values in a picture unit.

In accordance with one embodiment, 4 depth values in a picture (or a slice or a random area) unit may be used, as exemplarily shown in FIG. 19. In this case, all blocks within the picture (or the slice or the random area) may derive motion data using depth values of FIG. 19 without use of depth values of the respective blocks. In order to set depth values used in the respective blocks, an index may be signaled per block or be signaled per random area. Here, in order to minimize increase in a bit rate due to index signaling, only one depth value (or one or more depth values) per picture (slice or random area) may be used. If only one depth value per picture is used, signaling of each block is not required and thus, increase in the bit rate may be minimized.

In accordance with another embodiment, an index table may be created using selected depth values of respective blocks and thus, an information amount may be further reduced. In accordance with another embodiment, in a formed depth value list, depth values having lower index numbers (having higher priorities) may be sequentially used. Here, index signaling may not be performed, and the depth value list may be updated in the unit of a block through information (for example, a coding mode, motion data, etc.) of circumferential blocks and then used in the next block.

Another example of the decoding process using the above-described method will be described as follows.

Table 1 represents a process of modifying a motion vector in motion vector prediction. With reference to Table 1, the decoding process of calculating a motion vector will be described as follows.

TABLE 1

J.8.3.1.7.1 Modification process for inter view motion in median luma motion vector prediction
Input of this process is as follows.
- depth map picture ; depthPic,
- position of left uppermost end of current macroblock; (mbx1, mby1),
- position of left uppermost end of current prediction block; (dbx1, dby1),
- viewpoint ID of picture corresponding to current prediction block; view_id,
- motion vector; mv
Output of this process is as follows.
    - motion vector; mv
The viewpoint ID of a depth map is defined as refViewId, and a below process is performed in order.
1. Let's assume that a value acquired by multiplication of the width (partWidth) and the height (partHeight) of the current block is numSamples.
2. Let's derive a depth value (depthValue) for motion data derivation as follows.
offsetx, offsety are derived as follows.
If the depth map has the same size as a real image,
offsetx = 16-1 (i.e., 15, and this may be a random value.)
offsety = 16-1 (i.e., 15, and this may be a random value.)
Otherwise, if the depth map has a size corresponding to ¼ of the size of the real image,
offsetx = 8-1 (i.e., 7, and this may be a random value.)
offsety = 8-1 (i.e., 7, and this may be a random value.)
depthValue = depthPic[mbx1+offsetx, mby1+offsety]
3. A motion vector mv is derived as follows.
Index = ViewIdTo3DVAcquitision ParamIndex(view_id)
RefIndex = ViewIdTo3DVAcquitision ParamIndex(refView_Id)
mv[0] = Disparity(NdrInverse[depthValue], ZNear[frame_num, index], ZFar[frame_num, index], FocalLengthX[frame_num, index], AbsTX[index]−AbsTx[refIndex])mv[1] = 0
Here, the ViewIdTo3DVAcquitision ParamIndex( ) function outputs an index at a position having the same value as view_id in a view_id_3dv arrangement. The Disparity( ) function derives a motion vector using depthValue, Zfar, Znear, FocalLengthX, etc. Zfar and Znear represent real positions of a region (Zfar) is farthest from and a region (Znear) is nearest to a camera in a real observation space.

In Table 1, ViewIdTo3DVAcquitisionParamIndex functions to return the value of i, if view_id[i] is the same as viewId of an active sequence parameter set.

NdrInverse[i] may represent linear mapping or non-linear mapping. In case of linear mapping, output is determined according to input without change of scale or offset.

ZNear or ZFar may be used to represent the range of a depth sample constituting a non-linear depth view component.

According to Table 1, when a depth map picture (a depth reference view component) and the position of the left uppermost position of the current macroblock are used, a motion vector may be calculated using a viewpoint identifier (view_id) of a picture corresponding to the current prediction block.

TABLE 2

J.8.3.1.7.1 Modification process for inter view motion in median luma motion vector prediction
Input of this process is as follows.
- depth map picture ; depthPic,
- position of left uppermost end of current macroblock; (mbx1, mby1),
- position of left uppermost end of current prediction block; (dbx1, dby1),
- viewpoint ID of picture corresponding to current prediction block; view_id,
- motion vector; mv TABLE 2-continued Output of this process is as follows.
    - motion vector; mv
The viewpoint ID of a depth map is defined as refViewId, and a below process is performed in order.
1. Let's assume that a value acquired by multiplication of the width (partWidth) and the height (partHeight) of the current block is numSamples.
2. Let's derive the maximum depth value (maxDepth) for motion data derivation as follows.
offsetx, offsety are derived as follows.
If the depth map has the same size as a real image,
offsetx = 16-1 (i.e., 15)
offsety = 16-1 (i.e., 15)
Otherwise, if the depth map has a size corresponding to ¼ of the size of the real image,
offsetx = 8-1 (i.e., 7)
offsety = 8-1 (i.e., 7)
maxDepth = 0
for(j=0;j<offsety+1;j+=offsety)
    for(i=0;i<offsetx+1;i+=offsetx)
        if(depthPic[mbx1+1,mby1+j]>maxDepth)maxDepth=depthPic[mbx1+i,mby1+j]
3. A motion vector mv is derived as follows.
Index = ViewIdTo3DVAcquitision ParamIndex(view_id)
Refindex = ViewIdTo3DVAcqusition ParamIndex(refView_Id)
mv[0] = Disparity(NdrInverse[maxDepth], ZNear[frame_num, index], ZFar[frame_num, index], FocalLengthX[frame_num, index], AbsTX[index]−AbsTx[refIndex])mv[1] = 0
Here, the ViewIdTo3DVAcquitision ParamIndex( ) function outputs an index at a position having the same value as view_id in a view_id_3dv arrangement. The Disparity( ) function derives a motion vector using depthValue, Zfar, Znear, FocalLengthX, etc. Zfar and Znear represent real positions of a region (Zfar) is farthest from and a region (Znear) is nearest to a camera in a real observation space.

In the same manner, according to Table 2, when a depth map picture (a depth reference view component) and the position of the left uppermost position of the current macroblock are used, a motion vector (mv[0] and mv[1]) may be calculated using a viewpoint identifier (view_id) of a picture corresponding to the current prediction block.

If one 16×16 block is divided into 4×4 blocks, each 4×4 block uses 4 depth values and thus, a memory access bandwidth increases. In order to solve such a drawback, a specific block unit may not use the depth-based motion vector prediction (DMVP) method. In accordance with one embodiment, the 4×4 blocks may be set so as not to use the depth-based motion vector prediction (DMVP) method.

In accordance with one embodiment, the 4×4 blocks may be set so as not to use the depth-based motion vector prediction (DMVP) method. In this case, the motion vector of the corresponding blocks may be set to a zero vector (0,0).

Another example of the decoding process using the above-described method will be described as follows.

TABLE 3

J.8.3.1.7.1 Modification process for inter view motion in median luma motion vector prediction
Input of this process is as follows.
- depth map picture ; depthPic,
- position of left uppermost end of current macroblock; (mbx1, mby1),
- position of left uppermost end of current prediction block; (dbx1, dby1),
- viewpoint ID of picture corresponding to current prediction block; view_id,
- motion vector; mv
Output of this process is as follows.
- motion vector; mv
If the width (partWidth) or the height (partHeight) of the current block is '4', a motion vector (mv) is set to (0,0), and otherwise, derivation of the motion vector (mv) is performed in order according to a below process.
First, the viewpoint ID of a depth map is defined as refViewId.

TABLE 3-continued

1. Let's assume that a value acquired by multiplication of the width (partWidth) and the height (partHeight) of the current block is numSamples.
2. Let's derive the maximum depth value (maxDepth) for motion data derivation as follows.
offsetx, offsety are derived as follows.
If the depth map has the same size as a real image,
offsetx = 16-1 (i.e., 15)
offsety = 16-1 (i.e., 15)
Otherwise, if the depth map has a size corresponding to ¼ of the size of the real image,
offsetx = 8-1 (i.e., 7)
offsety = 8-1 (i.e., 7)
maxDepth = 0
offsety = 8-1 (i.e., 7)
offsety = 8-1 (i.e., 7)
3. The motion vector mv is derived as follows.
for(j=0;j<offsety+1;j+=offsety)
    for(i=0;i<offsetx+1;i+=offsetx)
        if(depthPic[mbx1+1,mby1+j]>maxDepth)maxDepth=depthPic[mbx1+i,mby1+j]
3. The motion vector mv is derived as follows.
index = ViewIdTo3DVAcquitision ParamIndex(view_id)
refindex = ViewIdTo3DVAcquisition ParamIndex(refView_Id)
mv[0] = Disparity(NdrInverse[maxDepth], ZNear[frame_num, index], ZFar[frame_num, index], FocalLengthX[frame_num, index], AbsTX[index]−AbsTx[refIndex])mv[1] = 0
Here, the ViewIdTo3DVAcquitision ParamIndex( ) function outputs an index at a position having the same value as view_id in a view_id_3dv arrangement. The Disparity( ) function derives a motion vector using depthValue, Zfar, Znear, FocalLengthX, etc. Zfar and Znear represent real positions of a region (Zfar) is farthest from and a region (Znear) is nearest to a camera in a real observation space.

According to Table 3, when a depth map picture (a depth reference view component) and the position of the left uppermost position of the current macroblock are used, a motion vector (mv[0] and mv[1]) may be calculated using a viewpoint identifier (view_id) of a picture corresponding to the current prediction block.

As exemplarily stated in Table 3, when the process is returned to the max disparity function searched from a depth map corresponding to a coding unit, such as a macroblock, motion data (mv[0] and mv[1]) may be calculated.

The above-described method may use High Efficiency Video Coding (HEVC), standardization of which is underway by the Moving Picture Experts Group (MPEG) and the Video Coding Experts Group (VCEG).

Therefore, the application range of the above-described method may vary according to block sizes, coding unit (CU) depths, or transform unit (TU) depths, as exemplarily shown in FIG. 20.

FIG. 20 is a table illustrating one example of application range determination methods of embodiments of the present invention (0: applied to a corresponding depth, X: not applied to a corresponding depth), if a given CU (or TU) depth is 2. Such a variable to determine the application range (i.e., size or depth information) may be set such that an encoder and a decoder may use a predetermined value or use a value determined according to a profile or a level, or, if the encoder states a variable value in a bitstream, the decoder may acquire such a value from the bitstream and then use the value. When the application range varies according to CU depths, as exemplarily shown in FIG. 20, there may be a method A in which the embodiments of the present invention are applied only to depths equal to and greater than the given depth, a method B in which the embodiments of the present invention are applied only to depths equal to and less than given depth, and a method C in which the embodiments of the present invention are applied only to the given depth.

Another example of the decoding process using the above-described method will be described as follows.

TABLE 4

J.8.3.1.7.1 Modification process for inter view motion in median luma motion vector prediction
Input of this process is as follows.
- depth map picture ; depthPic,
- position of left uppermost end of current macroblock; (mbx1, mby1),
- position of left uppermost end of current prediction block; (dbx1, dby1),
- viewpoint ID of picture corresponding to current prediction block; view_id,
- motion vector; mv
Output of this process is as follows.
- motion vector; mv
The viewpoint ID of a depth map is defined as refViewId, and a below process is performed in order.
1. Let's assume that a value acquired by multiplication of the width (partWidth) and the height (partHeight) of the current block is numSamples.
2. Let's derive the maximum depth value (maxDepth) for motion data derivation as follows.
offsetx, offsety are derived as follows.
If the depth map has the same size as a real image,
offsetx = 16-1 (i.e., 15)
offsety = 16-1 (i.e., 15)
Otherwise, if the depth map has a size corresponding to ¼ of the size of the real image,
offsetx = 8-1 (i.e., 7)
offsety = 8-1 (i.e., 7)
If the width (partWidth) or the height (partHeight) of the current block is '4', a below process is performed.
maxDepth = depthPic[mbx1+offsetx, mby1+offsety]
Otherwise, if the width (partWidth) or the height (partHeight) of the current block is not '4', a below process is performed.
maxDepth = 0
for(j=0;j<offsety+1;j+=offsety)
    for(i=0;i<offsetx+1;i+=offsetx)
        if(depthPic[mbx1+i,mby1+j]>maxDepth)maxDepth=depthPic[mbx1+i,mby1+j]
3. A motion vector mv is derived as follows.
index = ViewIdTo3DVAcquitision ParamIndex(view_id)
refindex = ViewIdTo3DVAcquitision ParamIndex(refView_Id)
mv[0] = Disparity(NdrInverse[maxDepth], ZNear[frame_num, index], ZFar[frame_num, index], FocalLengthX[frame_num, index], AbsTX[index]−AbsTx[refIndex])mv[1] = 0
Here, the ViewIdTo3DVAcquitision ParamIndex( ) function outputs an index at a position having the same value as view_id in a view_id_3dv arrangement. The Disparity( ) function derives a motion vector using depthValue, Zfar, Znear, FocalLengthX, etc. Zfar and Znear represent real positions of a region (Zfar) is farthest from and a region (Znear) is nearest to a camera in a real observation space.

When a depth map picture, i.e., a depth reference view component, and the position of the left uppermost position of the current macroblock (or the CU) are used, a motion vector (mv[0] and mv[1]) may be calculated using a viewpoint identifier (view_id) of a picture corresponding to the current prediction block (or the CU).

If the methods of the present invention are not applied to all depths, a random flag may be used, or a value larger than the maximum value of a CU depth by 1 may be signaled to a CU depth value representing an application range.

Further, in accordance with the present invention, whether or not the above-described method is applied may be included in the bitstream, and the method may be applied to a sequence parameter set (SPS), a picture parameter set (PPS), or slice header syntax using below semantics.

Table 5 shows one example of application to the SPS, Table 6 shows one example of application to the PPS, Table 7 shows one example of application to the slice header syntax, and Table 8 shows another example of application to the slice header syntax.

Table 5 represents one example of syntax of PS_RBSP among coded video data.

TABLE 5

| | Descriptor |
|---|---|
| seq_parameter_set_rbsp( ){ | |
|   profile_idc | u(8) |
|   reserved_zero_8bits/*equal to 0*/ | u(8) |
|   level_idc | u(8) |
|   ... | ue(v) |
|   dmvp_enabled_flag | u(1) |
|   if(dmvp_enabled_flag) | |
|     dmvp_disabled_info | ue(v) |
| ... | |

In Table 5, video data coded according to the syntax of SPS_RBSP may include information below.

profile_idc represents identification information of a coding profile of the coded video data.

level_idc represents a specific level of the coded video data or a level of the coded video data lower than the specific level.

dmvp_enabled_flag is a field to use a representative of a depth map of a coding block or a coding unit according to the size of the corresponding coding block or coding unit. A detailed example will be given later.

Table 6 represents one example of syntax of PPS_RBSP among coded video data.

TABLE 6

| | Descriptor |
|---|---|
| pic_parameter_set_rbsp( ){ | |
|   pic_parameter_set_id | ue(v) |
|   seq_parameter_set_id | ue(v) |
|   entropy_coding_mode_flag | u(1) |
|   ... | |
|   dmvp_enabled_flag | u(1) |
|   if(dmvp_enabled_flag) | |
|     dmvp_disabled_info | ue(v) |
| ... | |

In Table 6, video data coded according to the syntax of PPS_RBSP may include information below.

pic_parameter_set_id identifies a picture parameter set referred to by a slice header.

seq_parameter_set_id is an identifier referring to an active sequence parameter set of a syntax element within the picture parameter set.

entropy_coding_mode_flag represents an entropy coding method applied to the syntax element.

dmvp_enabled_flag is a field to use a representative of a depth map of a coding block or a coding unit according to the size of the corresponding coding block or coding unit. A detailed example will be given later.

Table 7 represents one example of syntax of a slice header among coded video data.

TABLE 7

| | Descriptor |
|---|---|
| slice_header( ){ | |
|   slice_type | ue(v) |
|   pic_parameter_set_id | ue(v) |
|   Frame_num | u(v) |
|   ... | |
|   dmvp_enabled_flag | u(1) |
|   if(dmvp_enabled_flag) | |
|     dmvp_disabled_info | ue(v) |
| ... | |

In Table 7, video data coded according to the syntax of the slide header may include information below.

slice_type represents a coding type of a slice.

pic_parameter_set_id represents a used picture parameter set.

frame_num is a field which may be used as a picture identifier.

dmvp_enabled_flag is a field to use a representative of a depth map of a coding block or a coding unit according to the size of the corresponding coding block or coding unit. A detailed example will be given later.

Table 8 represents another example of the syntax of the slice header among coded video data.

TABLE 8

|  | Descriptor |
|---|---|
| slice_header( ){ |  |
|    lightweight_slice_flag | u(1) |
|    if(!lightweight_slice_flag){ |  |
|      slice_type | ue(v) |
|      pic_parameter_set_id | ue(v) |
|      frame_num | u(v) |
|    ... |  |
|    } |  |
|    if(entropy_coding_mode_flag&&slice_type!=I) |  |
|      cabac_init_idc | ue(v) |
|    first_slice_in_pic_flag | u(1) |
|    ... |  |
|    dmvp_enabled_flag | u(1) |
|     if(dmvp_enabled_flag) |  |
|       dmvp_disabled_info | ue(v) |
| ... |  |

If lightweight_slice_flag is not true, video data includes values of the syntax included in Table 7.

In the same manner as the above-described examples, dmvp_enabled_flag is a field to use a representative of a depth map of a coding block or a coding unit according to the size of the corresponding coding block or coding unit.

In the examples represented by the above Tables, "dmvp_enabled_flag" indicates whether or not the depth-based motion vector prediction (DMVP) method is applied. If the depth-based motion vector prediction (DMVP) method is applied, "dmvp_enabled_flag" becomes '1', and if the depth-based motion vector prediction (DMVP) method is not applied, "dmvp_enabled_flag" becomes '0', and vice versa.

Further, "dmvp_disabled_info" is syntax activated if the depth-based motion vector prediction (DMVP) method is applied (or if "dmvp_enabled_flag" is true), and indicates whether or not the depth-based motion vector prediction (DMVP) method is applied according to the depth of a CU (or the size of the CU, the size of a macroblock, the size of a sub-macroblock, or the size of a block). As one example, if "dmvp_disabled_info" is '0', the depth-based motion vector prediction (DMVP) method may be applied to all block sizes. Further, if "dmvp_disabled_info" is '1', the depth-based motion vector prediction (DMVP) method may be applied only to units having sizes larger than the size of the 4×4 block. As another example, if "dmvp_disabled_info" is '2', the depth-based motion vector prediction (DMVP) method may be applied only to units having sizes larger than the size of the 8×8 block. Otherwise, vice versa.

For example, if "dmvp_disabled_info" is '1', the depth-based motion vector prediction (DMVP) method may be applied only to units having sizes smaller than the size of the 4×4 block. The usage method of the "dmvp_disabled_info" syntax may be variously applied.

Figure 21:
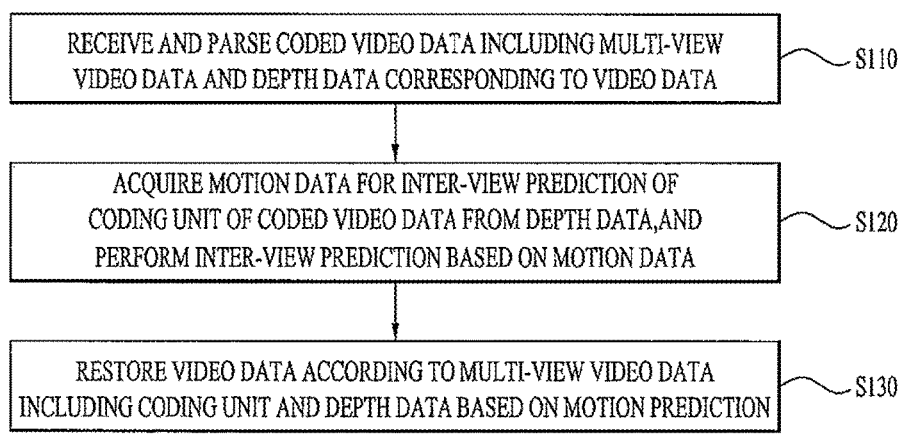
FIG. 21 is a view exemplarily illustrating a video data decoding method in accordance with one embodiment of the present invention.

FIG. 21 is a view exemplarily illustrating a video data decoding method in accordance with one embodiment of the present invention. With reference to FIG. 21, a video data decoding method in accordance with one embodiment of the present invention will be described as follows.

Coded video data including video data and depth data corresponding to the video data are received and parsed (Operation S110). Here, the video data may be video data according to 3D-AVC, or multi-view video data. Hereinafter, such video data is referred to simply as video data for convenience of description.

As exemplarily shown in FIG. 5, when a decoder receives a video bitstream including video data (texture) and depth data corresponding to the video data, the decoder may parse the corresponding video bitstream according to coded syntax. As exemplarily shown in FIG. 2 or 6, the video data and the depth data may correspond to each other.

Motion data for inter-view prediction of a coding unit of the coded video data is acquired from the depth data, and inter-view prediction is performed based on the motion data (Operation S120).

The coding unit may be a macroblock, or one of a coding unit, a prediction unit, and a transform unit which are defined in High Efficiency Video Coding (HEVC).

FIGS. 8 to 10 and FIGS. 14 to 17 illustrate examples as to the position of a depth value which a coding unit uses, in a depth map picture referred to by the coding unit to calculate motion data for motion prediction of the corresponding coding unit.

Tables 1 to 4 exemplarily describe processes of acquiring motion data.

As one example, the motion data may be calculated using the depth map picture in depth data referred by the coding unit, and at least one of position information of the left uppermost sample, right uppermost sample, left lowermost sample, and right lowermost sample of the coding unit.

Further, the motion data may be calculated further using a view identifier of the depth map picture and a view identifier of a picture including the coding unit.

As another example, the motion data may be calculated using the max disparity of depth values in the depth map picture referred to by the coding unit.

As exemplarily shown in FIG. 18, using depth values included in the depth map picture referred to by the coding unit, motion data of coding units adjacent to the coding unit may be calculated.

Further, as exemplarily shown in FIG. 16, if motion data of the coding unit is acquired, motion data of sub-coding units included in the coding unit may be calculated using the motion data of the coding unit.

The video data according to the multi-view video data including the coding unit and the depth data is restored based on motion prediction (Operation S130). The restored video data may be output to decoding samples according to the video data and the depth data corresponding to the video data.

Figure 22:
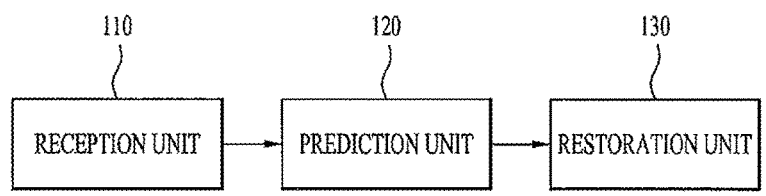
FIG. 22 is a view exemplarily illustrating a decoding system in accordance with one embodiment of the present invention.

FIG. 22 is a view exemplarily illustrating a decoding system in accordance with one embodiment of the present invention.

The decoding system in accordance with this embodiment of the present invention may be based on the right portion of FIG. 4 or 5.

The decoding system in accordance with this embodiment of the present invention may include a reception unit 110, a prediction unit 120, and a restoration unit 130.

The reception unit 110 may receive and parse video data including video data and depth data corresponding to the video data. The reception unit may perform entropy coding, dequantization, and inverse transform processes upon the received data.

In the reception unit 110, as exemplarily shown in FIG. 5, when the decoder receives a video bitstream including multi-view video data (texture) and depth data corresponding to the multi-view video data, the decoder may parse the corresponding video bitstream according to coded syntax.

The prediction unit 120 may calculate motion data using a reference image according to the intra-mode or the inter mode and thus perform motion prediction. The prediction unit 120 may acquire motion data for motion prediction of the coding unit of the multi-view video data from the depth data.

The coding unit may include a macroblock, or one of a coding unit, a prediction unit, and a transform unit which are defined in High Efficiency Video Coding (HEVC).

FIGS. 8 to 10 and FIGS. 14 to 17 illustrate examples as to the position of a depth value which a coding unit uses, in a depth map picture referred to by the coding unit to calculate motion data for motion prediction of the corresponding coding unit.

Tables 1 to 4 exemplarily describe processes of acquiring motion data through the prediction unit 120. As one example, the motion data may be calculated using the depth map picture in depth data referred by the coding unit, and at least one of position information of the left uppermost sample, right uppermost sample, left lowermost sample, and right lowermost sample of the coding unit. Further, the motion data may be calculated further using a view identifier of the depth map picture and a view identifier of a picture including the coding unit. As another example, the motion data may be calculated using the maximum disparity of depth values in the depth map picture referred to by the coding unit.

As exemplarily shown in FIG. 18, using depth values included in the depth map picture referred to by the coding unit, motion data of coding units adjacent to the coding unit may be calculated.

Further, as exemplarily shown in FIG. 16, if motion data of the coding unit is acquired, motion data of sub-coding units included in the coding unit may be calculated using the motion data of the coding unit.

The restoration unit 130 may compensate for motion of the video data, and restore the video data according to the video data including the coding unit and the depth data based on prediction.

Figure 23:
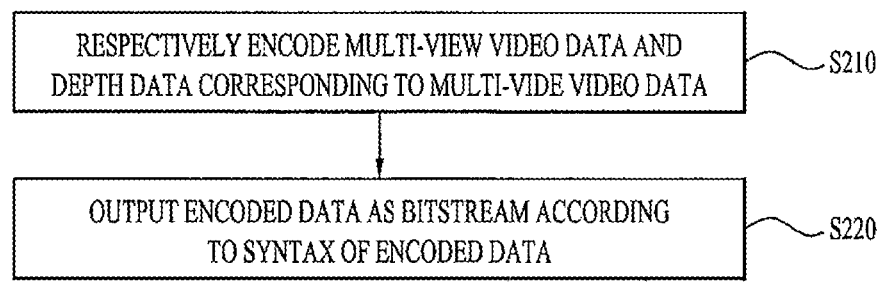
FIG. 23 is a view exemplarily illustrating an encoding method in accordance with one embodiment of the present invention.

FIG. 23 is a view exemplarily illustrating an encoding method in accordance with one embodiment of the present invention. With reference to FIG. 23, a video data encoding method in accordance with one embodiment of the present invention will be described as follows.

Multi-view video data and depth data corresponding to the multi-view video data are respectively encoded (Operation S210).

If the multi-view video data is encoded per coding unit, a depth map picture of the depth data may be referred to using a view identifier of the multi-view video data. The coding unit may include a macroblock, or one of a coding unit, a prediction unit, and a transform unit which are defined in High Efficiency Video Coding (HEVC).

For example, in order to increase coding efficiency, motion data may be calculated based on a depth map picture referred by the coding unit from depth data according to a corresponding view identifier, and at least one of position information of the left uppermost sample, right uppermost sample, left lowermost sample, and right lowermost sample of the coding unit. The motion data may be calculated further using a view identifier of the depth map picture and a view identifier of a picture including the coding unit. The motion data may be calculated using the maximum disparity of depth values in the depth map picture referred to by the coding unit.

When the multi-view video data and the depth data corresponding to the multi-view video data are encoded, only residual data which is a difference between inter-view predicted data and the coding unit may be encoded using the motion data.

The encoded data may be output as a bitstream according to the exemplarily described syntax (Operation S220).

As exemplarily shown in FIG. 5, the coded multi-view video data and depth data may be multiplexed and transmitted as the bitstream.

The transmitted data may be the video data based on the syntaxes of Tables 5 to 8 according to the corresponding transmitted data.

Figure 24:
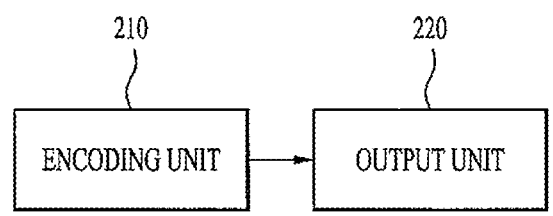
FIG. 24 is a view exemplarily illustrating an encoding system in accordance with one embodiment of the present invention.

FIG. 24 is a view exemplarily illustrating an encoding system in accordance with one embodiment of the present invention. With reference to FIG. 24, an encoding system in accordance with one embodiment of the present invention will be described as follows. Similarly to FIG. 5, the encoding system in accordance with this embodiment of the present invention includes an encoding unit 210 and an output unit 220.

The encoding unit 210 respectively encodes multi-view video data and depth data corresponding to the multi-view video data.

If the encoding unit 210 encodes the multi-view video data per coding unit, a depth map picture of the depth data may be referred to using a view identifier of the multi-view video data. The coding unit may include a macroblock, and one of a coding unit, a prediction unit, and a transform unit which are defined in High Efficiency Video Coding (HEVC).

FIGS. 8 to 10 and FIGS. 14 to 17 illustrate examples as to the position of a depth value which the coding unit uses, in the depth map picture referred to by the coding unit to calculate motion data for motion prediction of the corresponding coding unit.

The encoding unit 210 may calculate motion data based on the depth map picture referred by the coding unit from depth data according to a corresponding view identifier, and at least one of position information of the left uppermost sample, right uppermost sample, left lowermost sample, and right lowermost sample of the coding unit, and perform inter-view prediction using the calculated motion data. The motion data may be calculated using the maximum disparity of depth values in the depth map picture referred to by the coding unit.

The encoding unit 210 may encode only residual data of the coding unit.

The output unit 220 may output multi-view video data and depth data corresponding to the multi-view video data based on the syntaxes of Tables 5 to 8 according to whether or not the coded data is an SPS, a PPS, or a slice.

As exemplarily shown in FIG. 5, when the decoder receives a video bitstream including multi-view video data (texture) and depth data corresponding to the multi-view video data, the decoder may parse the corresponding video bitstream according to coded syntax. As exemplarily shown in FIG. 2 or 6, the video data and the depth data may correspond to each other.

[Mode for Invention]

Various embodiments have been described in the best mode for carrying out the invention.

INDUSTRIAL APPLICABILITY

The present invention may be repeatedly used in an encoder and decoder of video data and be thus industrially applicable.

The invention claimed is:

1. A method for decoding video data comprising:
receiving coded video data comprising video data and depth data corresponding to the video data;
acquiring motion data for inter-view prediction of a coding unit of the video data from the depth data;
performing inter-view prediction based on the motion data; and
reconstructing video data according to the video data comprising the coding unit and the depth data based on the inter-view prediction, the coding unit comprising at least one prediction block,
wherein the motion data for inter-view prediction of a prediction block of the video data is calculated using information derived from a depth map picture to which the coding unit refers, the information comprising the maximum value of depth values of the left uppermost position, right uppermost position, left lowermost position, and right lowermost position of a corresponding unit of the depth map picture to which the coding unit refers, and
where, in response to the coding unit comprising prediction blocks for which the inter-view predication is applied, the maximum value is shared in the prediction blocks for the motion data calculation of inter-view prediction.

2. The method according to claim 1, wherein the motion data is calculated further using a view identifier of the depth map picture or a view identifier of a picture comprising the coding unit.

3. The method according to claim 1, wherein the motion data is calculated further using the disparity of the maximum value of the depth values.

4. The method according to claim 1, wherein the video data comprises at least one texture.

5. The method according to claim 1, wherein the coding unit comprises a macroblock, or one of a coding unit, a prediction unit, and a transform unit that are defined in High Efficiency Video Coding (HEVC).

6. The method according to claim 1, wherein the acquiring motion data for inter-view prediction of the coding unit comprises deriving the motion data for inter-view prediction of the coding unit based on a location and a size of the coding unit.

7. The method according to claim 1, wherein the acquiring motion data for inter-view prediction of the coding unit comprises deriving the motion data for inter-view prediction of the coding unit based on information derived from a depth map block corresponding to a current prediction block.

8. An apparatus for decoding video data, the apparatus comprising:
a processor; and
a storage storing instructions executed by the processor, wherein the processor is configured to, in response to the instructions
receive and parse coded video data comprising video data and depth data corresponding to the video data,
acquire motion data for inter-view prediction of a coding unit of the video data from the depth data, and perform inter-view prediction based on the motion data, and
reconstruct video data according to the video data comprising the coding unit and the depth data based on the motion prediction, the coding unit comprising at least one prediction block,
wherein the motion data for inter-view prediction of a prediction block of the video data is calculated using information derived from a depth map picture to which the coding unit refers, the information comprising the maximum value of depth values of the left uppermost position, right uppermost position, left lowermost position, and right lowermost position of a corresponding unit of the depth map picture to which the coding unit refers, and
wherein in response to the coding unit comprising prediction blocks for which the inter-view prediction is applied, the maximum value is shared in the prediction blocks for the motion data calculation of inter-view prediction.

9. The apparatus according to claim 8, wherein the motion data is calculated further using a view identifier of the depth map picture or a view identifier of a picture comprising the coding unit.

10. The apparatus according to claim 8, wherein the motion data is calculated further using the disparity of the maximum value of the depth values.

11. The apparatus according to claim 8, wherein the coding unit comprises a macroblock, or one of a coding unit, a prediction unit, and a transform unit that are defined in High Efficiency Video Coding (HEVC).

12. The apparatus according to claim 8, wherein the video data comprises at least one texture.

13. The apparatus according to claim 8, wherein the processor is further configured to derive the motion data for inter-view prediction of the coding unit based on a location and a size of the coding unit.

14. The apparatus according to claim 8, wherein the processor is further configured to derive the motion data for inter-view prediction of the coding unit based on information derived from a depth map block corresponding to a current prediction block.

* * * * *